United States Patent [19]

Hiraoka et al.

[11] 3,953,310
[45] Apr. 27, 1976

[54] ELECTROCOATING PROCESS FOR PRODUCING INSULATED WIRE

[75] Inventors: Yukio Hiraoka, Osaka; Sadao Nakao; Yoshinobu Noda, both of Itami, all of Japan

[73] Assignee: Dainichi-Nippon Cables, Ltd., Amagasaki, Japan

[22] Filed: Feb. 20, 1975

[21] Appl. No.: 551,447

Related U.S. Application Data

[62] Division of Ser. No. 394,611, Sept. 5, 1973, Pat. No. 3,906,139.

[30] Foreign Application Priority Data

Sept. 5, 1972  Japan.................. 47-103340[U]

[52] U.S. Cl................................ 204/181; 427/118
[51] Int. Cl.².................. C25D 13/06; C25D 13/16
[58] Field of Search...................... 204/181; 427/118

[56] References Cited
UNITED STATES PATENTS

| 3,839,174 | 10/1974 | Masuda et al. | 204/181 |
| 3,891,526 | 6/1975 | Masuda et al. | 204/181 |

*Primary Examiner*—Howard S. Williams
*Attorney, Agent, or Firm*—Sughrue, Rothwell, Mion & Zinn

[57] ABSTRACT

An insulated wire suitable as a magnet wire having a baked layer of a specific polyacryl resin as an under-layer and a baked layer of a specific polyester resin as an upper-layer on the conductor as well as a process for producing the insulated wire are disclosed. The insulated wire according to the present invention exhibits well-balanced overall properties necessary for use as a magnet wire and has an excellent heat resistance.

6 Claims, 2 Drawing Figures

ELECTROCOATING PROCESS FOR PRODUCING INSULATED WIRE

This is a division of application Ser. No. 394,611, filed Sept. 5, 1973, now U.S. Pat. No. 3,906,139.

BACKGROUND OF THE INVENTION

1. Field of the Invention

This invention relates to an insulated wire useful as a magnet wire for use in electric equipment such as motors, transformers and the like, and to a process for producing the insulated wire.

2. Description of the Prior Art

Most of the conventional magnet wires insulated with an insulating varnish heretofore in use generally do not satisfy all the critical properties recently required, except for magnet wires coated with recently developed heat resistant resins, such as the polyamideimides, and techniques for multiple coating of the conductor with two or more different insulating materials have been proposed as disclosed in U.S. Pat. No. 3,022,200, U.S. Pat. No. 3,702,813, etc.

Generally speaking, the multiple coating insulating layer exhibits some advantages, i.e., the excellent properties possessed by specific layers included in the layers of multiple coatings compensate for the defects of the other layers. On the other hand, the excellent properties possessed by the layers sometimes can be masked by the presence of other layers and, in some cases, the presence of other layers adversely affects the properties. For example, the difficulty of operations for uncovering the tip of the wire coated with a polyamideimide resin due to an excessively strong chemical resistance of the resin to a remover can be solved by providing a polyester layer under the polyamide-imide layer, but, due to the presence of the polyester layer the abrasion resistance, the heat resistance, etc., of the polyester-polyamide-imide dual coated wire are inferior to those of a wire coated with the polyamide-imide alone. The thermoplastic polyester layer of the insulated wire wherein the thermoplastic polyester layer is coated on a baked thermosetting polyester layer functions to improve the heat-shock resistance and the abrasion resistance properties of the baked polyester layer, but it lowers the cut through temperature of the insulated wire.

As a result of extensive studies, it was surprisingly found that a dual insulating coating comprising a specific polyacryl resin layer having coated thereon a specific polyester resin layer exhibits excellent heat resistance properties over a coating of each of the above described resins and further it possesses well-balanced overall properties required for a coating of magnet wires. The present invention has been completed by a further investigation of the above unexpected finding.

SUMMARY OF THE INVENTION

A primary object of this invention is to provide an insulated wire having excellent heat resistance and well-balanced overall properties required for magnet wires.

Another object of this invention is to provide a process for improving the heat resistance of the magnet wires.

A further object of this invention is to provide a process for producing a magnet wire having excellent heat resistance and well-balanced overall properties for magnet wires.

More specifically, the present invention comprises an insulated wire having a baked layer of a specific polyacryl resin on a conductor and a baked layer of a specific thermosetting polyester resin on the above polyacryl resin layer and to a process for producing such an insulated wire.

DETAILED DESCRIPTION OF THE INVENTION

Figure 1:
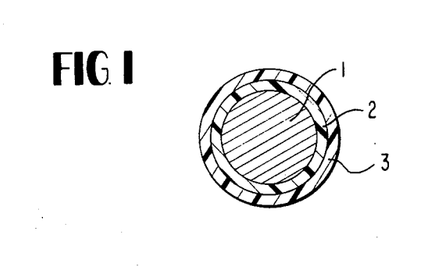
FIG. 1 is an enlarged schematic sectional view of the dual coated wire prepared according to an embodiment of this invention.

Referring now to FIG. 1, the dual coated wire having an excellent heat resistance and well-balanced overall properties can be obtained by providing a baked insulating layer 2 of the polyacryl resin as hereinafter specified on a conductor 1, and further by providing a baked insulating layer 3 of the polyester resin as hereinafter specified on the layer 2.

The polyacryl resin which can be used in the present invention is a copolymer of (a) at least one compound (hereinafter, designated the a-component for brevity) represented by the formula (I):

and (b) at least one compound (hereinafter, the b-component) of the formula (II):

and (c) an unsaturated organic acid (hereinafter, the c-component) having 3 to about 30 carbon atoms and at least one double bond which is reactable with the double bond of the a-component or b-component.

In the formula (I) or (II), $R_1$ represents hydrogen atom and an alkyl group having 1 to about 30 carbon atoms, such as methyl, ethyl, propyl, butyl and the like, $R_2$ represents a cyano group, an aldehyde group and a carboxyalkyl ester group having 2 to about 30 carbon atoms, such as carboxymethyl ester, carboxyethyl, ester, carboxypropyl ester, carboxybutyl ester and the like, $R_3$ and $R_4$ each represents a hydrogen atom, an amide group, a glycidyl ester group, glycidyl ether group and an organic group having 1 to about 30 carbon atoms selected from the group consisting of an alkyl group, such as methyl, ethyl, propyl, butyl and the like, an N-alkylamide group, such as N-methylamide, N-ethylamide, N-propylamide and the like, and an alkylol group, such as methylol, ethylol, propylol and the like, except that both $R_3$ and $R_4$ are not simultaneously a hydrogen atom or an alkyl group. When the number of carbon atoms of the above c-component and the $R_1$, $R_2$, $R_3$, or $R_4$ organic groups exceed about 30, the heat resistance of the resulting polyacryl resin tends to decrease and, therefore, the maximum number of carbon atoms of the c-component and the above $R_1$, $R_2$, $R_3$, or $R_4$ organic groups preferably does not exceed about 20.

Examples of the c-component are monobasic unsaturated acids, such as acrylic, crotonic, vinylacetic acid, methacrylic, tiglic, α-ethylacrylic, β-methylcrotonic, 2-pentenoic, 2-hexenoic, 2-heptenoic, 2-octenoic, 10-undecenoic, 9-octadecenoic, cinnamic, atropic, α-benzylacrylic, methyl atropic, 2,4-pentadienoic, 2,4-hexadienoic, 2,4-dodecadienoic acid, 9,12-octadecadienoic acid; dibasic unsaturated acids, such as maleic, fumaric, itaconic, citraconic, mesaconic, glutaconic, dihydromuconic, muconic; and tribasic unsaturated acids, such as 1,2,4-tricarboxylic butene and the like.

The polyacryl resin used in the present invention can be prepared by the well-known polymerization procedures such as an emulsoion polymerization, a solution polymerization, a suspension polymerization and the like as described, for example, in U.S. Pat. Nos. 2,787,561 and 3,509,033, and in "Acryl Resin" by Kou Asami, published by Nikkan Kogyo Shinbun, Tokyo, 1970, p. 25 to p. 27, using about 1 to 20 moles, preferably about 2 to 10 moles, or most preferably about 4 to 6 moles, of the a-component per one mole of the b-component and about 0.01 to 0.2 mole, preferably about 0.03 to 0.1 mole of the c-component per one mole of the a- and b-components, i.e., per mole of the sum of the moles of the a-component and the b-component.

Among the above described a-, b-, and c-components, more preferred examples are those components in which the total number of carbon atoms is less than 15 from the standpoint of the heat resistance of the polyacryl resin obtained. More preferred examples of the a-component are acrylonitrile, methacrylonitrile, methylacrylate, ethylacrylate, propylacrylate, butylacrylate, methylmethacrylate, ethylmethacrylate, propylmethacrylate, and acrolein. More preferred examples of the b-component are glycidylacrylate, glycidylmethacrylate, allylglycidylether, acrylamide, methylolacrylamide, and ethylolacrylamide. More preferred examples of the c-component are acrylic acid, methacrylic acid, α-ethylacrylic acid, crotonic acid, maleic acid, and fumaric acid.

The polyacryl resin employed in the present invention may also be those modified with one or more of styrene and its derivatives or diolefins. As the derivatives of styrene, there are employed those compounds in which the phenyl group of styrene is substituted with at least one group selected from the group consisting of a cyano group, a nitro group, a hydroxy group, an amine group, a vinyl group, a phenyl group, a halogen atom such as chlorine, bromine, etc., an organic group having 1 to 20 carbon atoms, such as an alkyl group, an aralkyl group, an N-alkylamine group. Examples of the above alkyl groups are methyl, ethyl, propyl, butyl, etc., and examples of the above aralkyl groups are benzyl, α- or β-phenylethyl, etc., and examples of the above N-alkylamine groups are N-methylamine, N-ethylamine, N-propylamine, etc. Among the styrene derivatives, those which have 1 to 3 substituent groups are preferable because of their ready reactivity with the a- to c-components. Preferable examples are methyl styrenes, ethyl styrenes, divinyl benzenes, chlorostyrenes. As the diolefins used as a modifying agent, those compounds are used whose total number of carbon atoms is 3 to about 20, preferably 4 to about 10. Examples of the above diolefins are the butadienes, pentadienes, methyl-butadienes and the like.

Polyacryl resins modified with those modifying agents can be prepared using well-known polymerization methods previously described using a starting material mixture containing one or more of the above modifying materials in addition to a-, b-, and c-components. However, the amount of styrene and its derivatives or diolefins should be restricted to about 2 moles or one mole or less, respectively, per one mole of the a-component, since use of the modifying materials in an amount greater than that described above results in the formation of a polyacryl resin poor in flexibility in the case of styrenes, and in the formation of polyacryl resin poor in the cut through temperature in the case of the diolefins.

In the present invention, a polyacryl resin (including the modified resin) having a degree of polymerization of approximately about 10,000 to about 1,000,000 is used, since a polyacryl resin having too low a degree of polymerization is lacking in toughness, and, in turn a polyacryl resin having too high a degree of polymerization tends to result in a somewhat uneven coating surface due to a poor fluidity of the resin in the uncured state. Therefore, more preferably polyacryl resins are those having a degree of polymerization of about 100,000 to about 500,000.

The polyacryl resin employable in this invention prepared by any one of the prior art processes can be coated on a conductor in the form of a dispersion or a solution in water or in an appropriate organic solvent such as N-methyl-2-pyrrolidone, N,N-dimethylformamide, N,N-dimethylacetamide, dimethylsulfoxide and the like using a polymer concentration of about 5 to about 50, preferably about 10 to about 30% by weight and subsequently the coating can be baked at a temperature ranging from about 100°C to about 600°C, preferably about 200°C to 500°C, whereby a tough insulating film can be formed on the conductor by crosslinking.

The polyester resin used in the present invention is a copolymer of (d) at least one terephthalic acid compound and its derivatives, generally represented by the Formula (III);

and (e) a mixture of polyols represented by the Formula (IV);

the mixture comprising at least one diol (that is, $n$ in the Formula (IV) is 2) and at least one compound of tri- and/or tetraol (that is, $n$ in the Formula (IV) is 3 or 4), and containing the diol(s) in an amount of about 40 to 97% equivalents in this polyol mixture.

In the polymerization between a compound represented by Formula (III) and a mixture of polyols represented by Formula (IV), the same polyester resin is obtained whether terephthalic acid or a derivative thereof is used as the compound of Formula (III), in other words, in spite of wide variation in $R_5$ and/or $R_6$ of the same formula. As a result, a broad range of $R_5$ and $R_6$ components can be used in that $R_5$ and $R_6$ are removed as condensation by-products in the course of the polymerization. Therefore, in the present invention, as $R_5$ and $R_6$ of Formula (III), various kinds of groups well-known to those in the art can be employed and are suitable. Examples of $R_5$ and $R_6$ groups are hydroxyl groups, amino groups, halogen atoms, such as chlorine, bromine, etc., alkoxy groups, such as methoxy, ethoxy, propoxy, butoxy, etc., N-alkylamino groups, such as N-methylamino, N-methylamino, etc., aryloxy groups such as phenoxy groups. However, from the standpoint of reactivity of the terephthalic acid derivatives with the polyol mixture, $R_5$ and $R_6$ groups having a total number of carbon atoms less than about 10, especially less than about 5, are preferred.

In the Formula (IV), $n$ is a positive integer of 2 to 4, and $R_7$ represents saturated or unsaturated hydrocarbon group having 2 to 10 carbon atoms. When the above $n$ in the Formula (IV) is 2, 3, or 4, the valency of $R_7$ becomes divalent, trivalent, or tetravalent, respectively.

Examples of divalent $R_7$ groups are alkylene or alkenylene groups or of which one or two hydrogen atoms on one or end carbon atoms can be replaced by one or two alkyl groups or alkenyl groups.

Examples of trivalent $R_7$ groups are, the above groups of which two hydrogen atoms of the end carbon atom can be replaced by one alkyl group or alkenyl group, or of which a hydrogen atom of another end carbon atom can be replaced by one or two alkyl or alkenyl groups, alkylene or alkenylene groups of which a hydrogen atom of one end carbon atom is replaced by one alkylene or alkenylene or alkenylidene group, or of which a hydrogen atom of both end carbon atoms is replaced by one alkyl or alkenyl group and one alkylene or alkenylene group or of which an inner carbon atom between both end carbon atoms is substituted with one alkylene or alkenylene group and one alkyl or alkenyl group.

Examples of tetravalent $R_7$ groups are alkylene or alkenylene groups of which a hydrogen atom of an end carbon atom and another end carbon atom, are substituted with one alkylene or alkenylene group, or of which an inner carbon atom between both end carbon atoms is substituted with two alkylene or alkenylene groups. The above hydrocarbon group may contain in its carbon chain a hetero atom such as oxygen, nitrogen and the like or at least one, preferably 1 to 5, four to eight membered heterocyclic ring, such as a pyrazine ring, a pyrazole ring, a triazine ring, etc., or 1 to 5 benzene type rings, such as phenylene, phenylene ether, and may also be substituted with at least 1, preferably 1 to 5, phenyl groups and/or aralkyl groups having about 7 to 10 carbon atoms such as benzyl groups.

Examples of the above polyols which can be used in the preparation of the polyesters are aliphatic diols such as ethylene glycol, propylene glycol, butane diol and the like, aromatic ring-containing diols such as 2,2-bis(p-hydroxyethoxyphenyl)propane and the like, triols such as glycerine, 1,1,1-trimethylolethane, 1,1,1-trimethylolpropane, tris-2-hydroxyalkyl isocyanurate and the like, and tetraols such as pentaerythritol and the like. When the amount of the diol in the polyol mixture is greater than about 97% equivalents, the cut through temperature of the resulting polyester resin tends to decrease, and, on the other hand, when the amount of the diol is lower than about 40%, a reduction in flexibility of the polyester resin tends to result. Thus, the polyol mixture preferably contains about 45 to 90% equivalents of the diols. The polyester resins can be prepared using well-known polymerization techniques, e.g., a solution polymerization as described in U.S. Pat. No. 3,296,024. In the polymerization of terephthalic acid or its derivatives with the polyol mixture, isophthalic acid or its derivatives in an amount less than about 60 moles per 100 moles of terephthalic acid of the Formula (III) may be added in the polymerization reaction. As derivatives of isophthalic acid, those corresponding to the derivatives of terephthalic acid described above can be employed. Particularly preferred polyester resins are those obtained by reacting about 25 to 56 % equivalents of terephthalic acid or a derivative thereof with about 15 to 46% equivalents of ethylene glycol and about 7 to 22% equivalents of glycerine and about 7 to 22% equivalents of tris-2-hydroxyethyl isocyanurate. In the above reaction, the proportion of glycerine and tris-2-hydroxyethyl isocyanurate can be varied as long as the sum of equivalents of glycerin plus tris-2-hydroxyethyl isocyanurate is about 14 to 44%.

The polyester resins which can be used in the present invention can be a modified polyester resin containing not greater than 70 imide groups or the sum of the amide groups plus the imide groups per 100 ester linkages in the resin. Modified polyester resins can be prepared by using an imide- or amideimide-containing substance in the reaction between terephthalic acid or a derivative thereof and a polyol mixture. Alternatively, the modified polyester resins can also be prepared by reacting an imide- or amide-imide-containing substance with a polymerization product having a low degree of polymerization of about 1 to about 10 between terephthalic acid or a derivative thereof and the polyol mixture. Such an imide- or amide-imide-containing substance can be obtained, for example, by reacting a polybasic acid or its anhydride higher than tribasic acid as disclosed in U.S. Pat. Nos. 3,489,696, 3,471,444 and 3,485,796 such as trimellitic anhydride, pyromellitic dianhydride, butane tetracarboxylic dianhydride, with a diamine as disclosed in U.S. Pat. No. 3,480,588 such as 4,4'-diaminodiphenyl methane, 4,4'-diaminodiphenyl ether, hexamethylenediamine, and/or a diisocyanate, as disclosed in U.S. Pat. No. 3,489,696 such as 4,4'-diisocyanate-diphenyl methane, 4,4'-diisocyanate-diphenyl ether, hexamethylene diisocyanate. Preferred imide- or amide-imidecontaining substances are those having a low degree of polymerization, containing imide groups or the sum of amide and imide groups of 1 to 2, to a degree of polymerization about 10. Substances having such a degree of polymerization can easily be prepared by adjusting the molar ratio of starting materials and polymerization conditions such as temperature and period of polymerization. An alternative procedure of introducing the imide groups or amide and imide groups into the polyester resin comprises dissolving the above described imide- or amide-imide-containing substance, a polyamide-imide resin, or a polyamic acid resin which is a precursor of the polyimide together with the polyester resin in a suitable solvent, such as phenol, cresol, xylenol, N-methyl-2-pyrollidone, N,N-dimethylacetamide and the like, applying the resulting varnish on a conductor, and baking the varnish. In this case, the polyester resin reacts with the above additive upon baking whereby the imide groups or amide-imide groups are introduced into the polyester resin.

In the present invention, a polyester resin (including the modified resins) having a degree of polymerization of approximately about 2 to 200 is used, since a polyester resin having too low a degree of polymerization lacks toughness, and a polyester resin having too high a degree of polymerization tends to gel in the preparation of a varnish thereto. Therefore, more preferable polyester resins are those having a degree of polymerization ranging from about 10 to 50.

The polyester resin used in the present invention forms a tough insulating layer by crosslinking when a dispersion or solution thereof in a solvent such as water, phenol, cresol, xylenol, N-methyl-2-pyrollidone, N,N-dimethylacetamide and the like in a polymer concentration of about 5 to about 50%, preferably about 15 to about 45% by weight is applied to a conductor and baked at a temperature ranging from about 100°C to about 600°C, preferably about 200°C to about 500°C.

In the present invention, the layer thickness of both the under-layer and the upper-layer can be varied freely, but the layer thickness of the under-layer is preferably from about 1 to 300 $\mu$, particularly, from about 5 to 100 $\mu$ and the thickness of upper-layer is preferably from about 0.3 to 100 $\mu$, particularly, from about 2 to 50 $\mu$. The particularly preferred heat resistance and the well-balanced overall properties as an insulated wire for coils can be obtained when the thickness ratio of the under-layer to the upper-layer is within the range of from about 0.1 to 30, preferably from about 7 to 15.

In producing an insulated wire according to the present invention, the layer of the polyacryl resin and the layer of the polyester resin can be formed on a conductor using any conventional procedure such as, for example, by a well-known coating method such as dip-coating, spray-coating, brush-coating or using electrodeposition coating as described in Wire World, vol. 13, May/June, page 69, 1971, and Wire, vol. 40, No. 6, page 832, 1965, followed by baking according to a conventional baking procedures. The polyester resin varnish can be applied onto an uncured or cured polyacryl resin layer, and baked together with the uncured or already cured polyacryl resin layer. In using either a separate or a simultaneous baking of the polyacryl resin layer and polyester resin layer, the baking can generally be carried out at a temperature ranging from about 200°C to 600°C. It is preferred to dry the coated wire at a temperature below about 200°C prior to the baking since the tendency of blistering of the coating layers which is frequently observed in baking without previous drying, can effectively be prevented. The above described drying prior to the baking is desirable when the insulated wire is produced at a rate higher than about 50 m per minute.

However, in a preferred embodiment for advantageously, especially economically, producing an insulated wire of high quality, the polyacryl resin is first electrodeposited on a conductor, and then the polyester resin film is formed thereon using electrodeposition coating or the dip-coating of a polyester resin varnish.

The process for producing the insulated wire according to the present invention is hereinafter described in greater detail by reference to FIG. 2 in a preferred embodiment comprising coating a conductor with a polyacryl resin by electrodeposition coating and then applying a polyester varnish by dip-coating to the polyacryl resin film.

Figure 2:
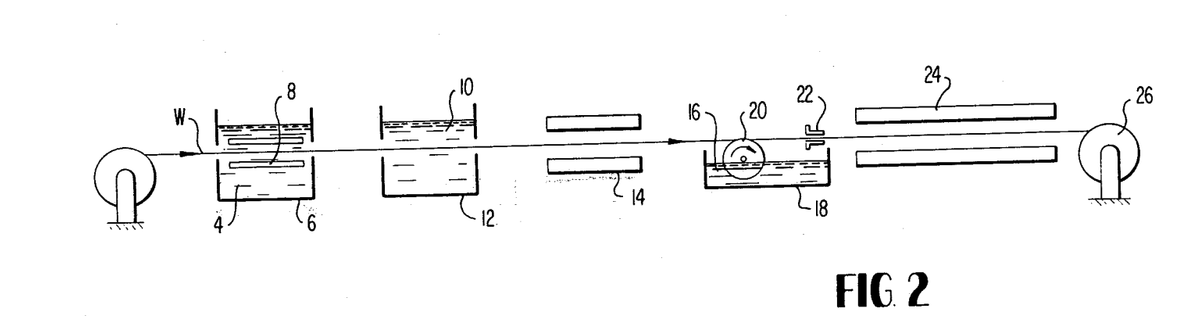
FIG. 2 illustrates an example of the processing line for producing the dual coated wire according to the present invention.

Referring to FIG. 2, a conductor W such as copper, aluminum and the like which is connected to the positive terminal of a D.C. power supply (not shown) is passed through an electrodeposition bath 6 filled with a polyacryl resin varnish 4 in the form of an aqueous solution or an aqueous dispersion. A cylindrical cathode 8 is mounted in the electrodeposition bath 6, and the polyacryl resin particles from the varnish are deposited uniformly on the conductor W by electrophoresis due to the potential difference between the conductor, as the anode, and the cathode while the conductor passes through the cathode. As a polyacryl resin varnish used in the electrodeposition coating, suitable varnishes may be used, such as the emulsified product per se of a polyacryl resin prepared by the emulsion polymerization process described in U.S. Pat. Nos. 2,787,561 and 3,509,033, an aqueous solution of a polyacryl resin together with, if necessary, an amine disclosed in U.S. Pat. No. 3,230,162, and a water dispersion of a polyacryl resin having particle size of about 0.01 $\mu$ to about 1.0 $\mu$ in diameter with a well-known surface active agent.

The electrodeposition coating using the above described polyacryl resin in the present invention can be carried out under the conditions well-established in the art as described in U.S. Pat. No. 3,378,477. That is, the polyacryl resin varnish containing from about 5 to 50% by weight of a polyacryl resin can be used with a load voltage of from about 10 to 200 V for the aqueous solution varnish and from about 1 to 50 V for the aqueous dispersion varnish. In the electrodeposition coating, an A.C. current can be superposed on the D.C. current. The conductor W having coated thereon the electrodeposited coating of the polyacryl resin can then be dried and baked, or can be directly subjected to the over-coating of the polyester resin varnish. However, it is preferred, in particular, when the polyacryl resin varnish is in the form of an aqueous dispersion, that the polyacryl resin coated conductor be passed through an organic solvent bath 12 filled with an organic solvent 10 which is capable of dissolving water to an extent of at least about 1% by weight, preferably at least about 10% by weight and which is capable of at least swelling, preferably, dissolving the polyacryl resin deposited on the conductor prior to the heat-drying or the crosslinking of the resin. In this manner, the water contained in the polyacryl resin deposited on the conductor is eluted into the organic solvent and, at the same time, a portion of the organic solvent penetrates into the deposited polyacryl resin layer during the passage of the conductor through the organic solvent bath, whereby the penetrated solvent retained in the resin layer serves to render the film more uniform with less pinholes by swelling or dissolving the resin until it is removed in a subsequent evaporation step. The treatment with the organic solvent should preferably be accomplished while the polyacryl resin deposited on the conductor remains wet by a medium for the polyacryl resin varnish (in this embodiment, water), or a poor result will be obtained if the treatment is carried out after the deposited polyacryl resin is dried.

Also, since the treatment with the organic solvent is not effective on the semi-cured or completely cured polyacryl resin, it is necessary that the organic solvent used be capable of at least swelling the polyacryl resin before the semi-cured stage. Examples of such organic solvents both dissolving water and swelling and/or dissolving the resin are monohydric or polyhydric alcohols such as methanol, ethanol, propanol, ethylene glycol, glycerine and the like, cellosolves such as ethylene glycol monomethyl ether, ethylene glycol monoethyl ether, ethylene glycol isopropyl ether, ethylene glycol monobutyl ether, ethylene glycol diethyl ether, ethylene glycol dibutyl ether, ethylene glycol monophenyl ether and the like, nitrogen-containing organic solvents such as N,N-dimethylformamide, N,N-dimethylacetamide, N-2-methylpyrrolidone and the like, sulfur-containing organic solvents such as dimethylsulfoxide, etc. In particular, N,N-dimethylformamide, N,N-dimethylacetamide, N-2-methylpyrrolidone and dimethylsulfoxide are preferred.

In a preferred and particularly, advantageous embodiment of this invention, a D.C. voltage of from about 30 to 500 V with or without an A.C. voltage superposed thereupon lower than the D.C. voltage is applied between a cathode (not shown) mounted in the bath 12 and the conductor W passing through the cathode. In this manner, the water in the deposited layer can be removed uniformly and effectively so as to give an insulated wire having more stable qualities.

As an alternative procedure for treatment of the deposited resin layer with an organic solvent, the deposited resin layer can be exposed to an organic solvent vapor or the organic solvent can be sprayed on the deposited resin layer, etc. as described in British Pat. No. 1169447.

It is preferred to continuously remove any excess of the bath liquid 4 and the bath liquid 10 adhering to the resin layer by providing a wiping means such as an air-wiper, roll-wiper and the like at the outlet of the electrodeposition bath 4 and the organic solvent bath 12. The adhering liquid sometimes prevents a high speed operation of the electrodeposition coating of the polyacryl resin, because of blistering of the adhering liquid in the baking process and such a wiping means eliminates the liquid so as to permit a conductor line speed of greater than about 50 m per minute.

The conductor from the organic solvent bath 12 is then introduced into a drying means 14 where the conductor is heated and the organic solvent from the bath 12 and water remaining in the resin layer in those methods retaining water are removed by evaporation. The drying temperature in the drying means 14 varies somewhat depending upon the type of the organic solvent, but generally ranges from about 60° to 200°C, preferably from about 100° to 200°C. In the drying means 14, an elevated temperature (for example, about 200°C to 600°C) can be used for promoting the removal of liquids and at the same time for curing or semi-curing the polyacryl resin deposited on the conductor. Alternatively, the last portion of the drying means 14 can be maintained at the temperature required for curing the polyacryl resin or a baking means can be provided separately at the end of the drying means, whereby the polyacryl resin layer is first dried at a relatively low temperature, i.e., about 100°C and then cured or semi-cured at a high temperature. The above-described procedure where the drying and baking are conducted separately is particularly preferred for prevention of blistering due to the rapid evaporation of the liquid from the polyacryl resin layer. The conductor from the drying means 14 is then passed on the bath 18 filled with a polyester resin varnish 16 while contacting a roll 20 which is mounted in the bath 18 and rotates freely. While passing on the roll 20, the polyacryl resin layer on the conductor is over-coated with a polyester resin varnish 16 by the roll 20, and an excess of the varnish 16 is wiped by a metering device 22 such as a metal die which is fixedly mounted downstream of the roll 20. The conductor W which has been dual coated with the polyacryl resin and the polyester resin is sent to a baking oven 24 and both layers (or the polyester layer alone when the polyacryl resin layer has already been baked) are baked and cured. The baking temperature of the baking oven 24 can be approximately the same whether both polyacryl and polyester layers are baked simultaneously or only the polyester resin layer is baked and generally is in the range of from about 200° to 600°C. The conductor from the baking oven can be immediately wound on a reel 26 or, if necessary, the conductor may be repeatedly passed several times through the polyester resin bath 18 and the baking oven 24 in order to obtain a desired layer thickness of the polyester resin layer.

In place of the application of the polyester resin as described above, the polyester resin can be coated on the polyacryl resin layer using electrodeposition coating under conditions and procedures similar to those described for the electrodeposition of the polyacryl resin layer using an electrodeposition varnish of the polyester resin in the form of an aqueous dispersion or an aqueous solution containing about 5 to 50% by weight of the polyester resin.

The following examples illustrate in greater detail the insulated wires of the present invention and their excellent properties as well as the process for the production of the insulated wires, but they are not to be construed as limiting the scope of this invention.

The coating materials containing polyacryl resins or polyester resins were prepared according to the following procedures. Of these coating materials, "Acryl-A" to "Acryl-L" and "Polyester-A" to "Polyester-I" are polyacryl resins and polyester resin coating materials, respectively, suitable for the present invention, and "Acryl-M" and "Polyester-J" were prepared for the purpose of comparison.

[Polyacryl-A]

A monomer mixture consisting of 5 moles of acrylonitrile, 1 mole of acrylic acid, 0.3 mole of glycidylmethacrylate, 760 g of deionized water, 7.5 g of sodium lauryl sulfate, and 0.13 g of sodium persulfate were charged into a flask, and stirred under a nitrogen stream at room temperature for 15 to 30 minutes. Thereafter the mixture was reacted at a temperature of 50° to 60°C for a period of 4 hours to obtain an acryl varnish as an aqueous dispersion.

[Polyacryl-B]

The acryl varnish was prepared in the same manner as described in the preparation of Polyacryl-A but using a monomer mixture consisting of 5 moles of acrolein, 1 mole of methacrylic acid and 0.3 mole of acrylic amide in place of the monomer mixture of Polyacryl-A.

[Polyacryl-C]

The acryl varnish was prepared in the same manner as described in the preparation of Polyacryl-A but using a monomer mixture consisting of 5 moles of ethylacrylate, 1 mole of acrylic acid, 0.3 mole of methylol acrylamide, 1200 g of deionized water, 12 g of sodium lauryl sulfate and 0.2 of sodium persulfate.

[Polyacryl-D]

The acryl varnish was prepared in the same manner as described in the preparation of Polyacryl-A but using 5 moles of acrylonitrile, 1 mole of maleic acid, 0.3 mole of glycidyl methyacrylate, 840 g of deionized water, 8 g of sodium lauryl sulfate and 0.15 g of sodium persulfate.

[Polyacryl-E]

The acryl varnish was prepared in the same manner as described in the preparation of Polyacryl-A but using 5 moles of ethylacrylate, 1 mole of maleic acid, 0.3 mole of glycidyl acrylate, 1300 g of deionized water, 13 g of sodium lauryl sulfate and 0.2 g of sodium persulfate.

[Polyacryl-F]

The acryl varnish was prepared in the same manner as described in the preparation of Polyacryl-A but using a monomer mixture consisting of 5 moles of methacrylonitrile, 1 mole of methacrylic acid, 0.3 mole of methylol acrylamide, 900 g of deionized water, 9 g of sodium lauryl sulfate and 0.2 g of sodium persulfate.

[Polyacryl-G]

The acryl varnish was prepared in the same manner as described in the preparation of Polyacryl-A but using 5 moles of methacrylonitrile, 1 mole of maleic acid, 0.3 mole of allyl glycidyl ether, 970 g of deionized water, 10 g of sodium lauryl sulfate and 0.15 g of sodium persulfate.

[Polyacryl-H]

The acryl varnish was prepared in the same manner as described in the preparation of Polyacryl-A but using 3 moles of acrylonitrile, 2 moles of ethylacrylate, 0.5 mole of acrylic acid, 0.5 mole of methacrylic acid, 0.2 mole of glycidyl methacrylate, 0.1 mole of acrylamide, 950 g of deionized water, 9.5 g of sodium lauryl sulfate and 0.16 g of sodium persulfate.

[Polyacryl-I]

The acryl varnish was prepared in the same manner as described in the preparation of Polyacryl-A but using 5 moles of methylmethacrylate, 0.5 mole of acrylic acid, 0.5 mole of methacrylic acid, 0.2 mole of glycidyl methacrylate, 0.1 mole of acrylamide, 1200 g of deionized water, 12 g of sodium lauryl sulfate and 0.2 g of sodium persulfate.

[Polyacryl-J]

The acryl varnish was prepared in the same manner as described in the preparation of Polyacryl-A but using 5 moles of butyl acrylate, 0.5 mole of acrylic acid, 0.5 mole of methacrylic acid, 0.2 mole of glycidyl methacrylate, 0.1 mole of acrylamide, 1500 g of deionized water, 15 g of sodium lauryl sulfate and 0.25 g of sodium persulfate.

[Polyacryl-K]

The acryl varnish was prepared in the same manner as described in the preparation of Polyacryl-A but using 5 moles of acrylonitrile, 1 mole of acrylic acid, 0.3 mole of glycidyl methacrylate, 2 moles of styrene, 1200 g of deionized water, 12 g of sodium lauryl sulfate and 0.2 g of sodium persulfate.

[Polyacryl-L]

The acryl varnish was prepared in the same manner as described in the preparation of Polyacryl-A but using 3 moles of acrylonitrile, 2 moles of ethyl acrylate, 0.5 mole of acrylic acid, 0.5 mole of methacrylic acid, 0.2 mole of glycidyl methacrylate, 0.1 mole of acrylamide, 1 mole of 1,3-butadiene 1100 g of deionized water, 11 g of sodium lauryl sulfate and 0.18 g of sodium persulfate.

[Polyacryl-M]

The acryl varnish was prepared in the same manner as described in the preparation of Polyacryl-A but using 2 moles of styrene, 5 moles of ethyl acrylate, 1400 g of deionized water, 14 g of sodium lauryl sulfate and 0.2 g of sodium persulfate.

The concentration of a polyacryl resin in each of the above Polyacryl-A to Polyacryl-M varnishes was about 30% by weight.

[Polyester-A]

The polyester resin was prepared from the following composition:

| | |
|---|---|
| Dimethyl Terephthalate | 223.1 g (46% equivalents) |
| Ethylene Glycol | 48.1 g (31% equivalents) |
| Glycerin | 35.2 g (23% equivalents) |

A mixture of the above composition and 50 g of xylol was charged into a four-necked flask equipped with a thermometer, a stirrer and a Liebig condenser. The flask was then heated to a temperature of about 130°C over 30 minutes while introducing nitrogen gas through an additional inlet, with the methyl alcohol formed in the course of the reaction being removed continuously from the flask as an azeotropic mixture with the xylol. At this point, lead acetate was added to the reaction mixture in an amount equivalent to about 0.03% by weight based on the weight of dimethyl terephthalate, and the heating was continued for additional 3.5 hours at the end of which time the temperature of reaction mixture reached 240°C. To the resulting hot resin was then added cresol in an amount sufficient to obtain a resin solution having a solids content of 44.8% by weight.

[Polyester-B]

52.4 g of 4,4'-diisocyanate-dicyclohexylmethane, 57.6 g of trimellitic anhydride and 250 g of cresol was heated in a flask at a temperature of 70° to 75°C for a period of 5 hours while stirring. To the resulting solution was then added an excess of acetone to precipitate a resin.

388 g (39.8% equivalents) of dimethyl terephthalate, 137 g (35.8% equivalents) of propylene glycol, 75 g (24.4% equivalents) of glycerin, 337 g of the above resin precipitate and xylene were then charged into a flask, and lead acetate was added to the mixture in an amount of 0.05% by weight based on the amount of dimethyl terephthalate. The mixture was then heated at a temperature of 150°C under a nitrogen stream for 10 hours to obtain a polyesteramide-imide resin. The resin was diluted with cresol to a solids content of 40% and zinc octoate was added in an amount sufficient to adjust to a zinc content of 0.2% by weight to obtain the desired varnish.

[Polyester-C]

The polyester varnish was prepared in the same manner as described in the preparation of Polyester-A but using 43.5 g (10% equivalents) of tris-2-hydroxyethyl isocyanurate and 19.9 g (13% equivalents) of glycerin in place of 35.2 g (23% equivalents) of glycerin to obtain a varnish having a solids content of 40% by weight.

[Polyester-D]

The polyester varnish was prepared in the same manner as described in the preparation of Polyester-B but using 33.6 g of hexamethylene diisocyanate in place of 52.4 g of 4,4'-di-isocyanate-dicyclohexylmethane and 51.6 g of butane tricarboxylic anhydride in place of 57.6 g of trimellitic anhydride.

[Polyester-E]

The polyester varnish was prepared in the same manner as described in the preparation of Polyester-A but using 223.1 g (46% equivalents) of dimethyl terephthalate, 31.0 g (20% equivalents) of ethylene glycol, 20.9 g (11% equivalents) of propylene glycol, 19.9 g (13% equivalents) of glycerin and 22.3 g (10% equivalents) of 1,1,1-trimethylolpropane to obtain a varnish having a solids content of 30% by weight.

[Polyester-F]

150 g of trimellitic anhydride was dissolved in 500 g of cresol at a temperature of 150°C and, after the annydride was completely dissolved, 60 g of 4,4'-diaminediphenylmethane was added to the resulting solution. The mixture was then stirred for 6 hours at a temperature of 140°C and allowed to cool to obtain a pale yellow precipitate. The precipitate was filtered and washed several times with ethanol and ether to obtain an imide-group containing substance.

Separately, 388 g (39.8% equivalents) of dimethyl terephthalate, 163 g (36.0% equivalents) of 1,4-butanediol and 75 g (24.2% equivalents) of glycerin were reacted in the same manner as described in the preparation of Polyester-A to obtain a polyester resin.

137 g of the above imide-group containing substance was then added to the polyester resin, and the mixture was heated at a temperature in the range of from 180° to 215°C until a homogeneous mixture where the imide-group containing substance was completely integrated with the polyester resin was obtained. Then, 1.8 g of cadmium acetate was added to the mixture and the resulting mixture was heated at a temperature of 215°C for 3 hours in vacuo. 450 g of cresol and 27 g of a cresol solution containing 9 g of butyl titanate were added followed by cresol to obtain a varnish having a solids content of 37% by weight.

[Polyester-G]

The polyester varnish was prepared in the same manner as described in the preparation of Polyester-F but using 70 g (22.5% equivalents) of ethylene glycol and 51 g (13.3% equivalents) of propylene glycol in place of 163 g (36.0% equivalents) of 1,4-butanediol and 45 g (14.6% equivalents) of glycerin and 85 g (9.8% equivalents) of tris-2-hydroxyethylisocyanurate in place of 75 g (24.2% equivalents) of glycerin to obtain a varnish having a solids content of 37% by weight.

[Polyester-H]

The polyester varnish was prepared in the same manner as described in the preparation of Polyester-A but using 195.0 g (40.2% equivalents) of dimethyl terephthalate, 28.1 g (5.8% equivalents) of dimethyl isophthalate, 31.0 g (20.0% equivalents) of ethylene glycol, 13.5 g (6.0% equivalents) of 1,4-butanediol and 42.9 g (28% equivalents) of glycerin to obtain a varnish having a solids content of 43% by weight.

[Polyester-I]

The polyester varnish was prepared in the same manner as described in the preparation of Polyester-A but using 223.1 g (46.0% equivalents) of dimethyl terephthalate, 38.8 g (25.0% equivalents) of ethylene glycol, 13.5 g (6.0% equivalents) of 1,4-butanediol, 30.7 g (20.0% equivalents) of glycerin, 5.1 g (3.0% equivalents) of pentaerythritol to obtain a varnish having a solids content of 30% by weight.

[Polyester-J]

98 g (23.8% equivalents) of maleic anhydride, 148 g (23.8% equivalents) of phthalic anhydride and 233 g (52.4% equivalents) of diethylene glycol were reacted in a manner similar to that described in the preparation of Polyester-A but using about 0.02 g of hydroquinone as a polymerization inhibitor and a sufficient amount of styrene to obtain a polyester resin solution having a solids content of 50% by weight.

EXAMPLE 1

A copper conductor having a diameter of 0.3 mm was coated with Polyacryl-A by the conventional dip-coating procedure using a horizontal coating machine and a metal die, and the coated conductor was then baked at a line speed of 40 m/minute at a temperature of 400°C. The above procedure was repeated five times to form an insulating under-layer having a layer thickness of 22 μ on the copper conductor. Polyester-A was then coated on the insulating under-layer at a line speed of 40 m/minute and the coated conductor was baked one time at a temperature of 450°C to form an insulating upper-layer having a layer thickness of 3 μ to obtain a dual coated wire having a total insulating coating thickness of 25 μ.

EXAMPLE 2

A copper conductor having a diameter of 0.3 mm as an anode was coated with Polyacryl-B by employing conventional elecrodeposition coating using a horizontal coating machine at a line speed of 40 m/minute under the following conditions:

Cathode: A copper cylindrical tube of 6 cm in diameter and 30 cm in length
Distance between Electrodes: 3 cm
Electrodeposition Voltage: 5V D.C.
Varnish Temperature: 30 ± 1°C The coated conductor was then passed through a chamber having a length of 1 m filled with a saturated vapor of N,N-dimethylformamide at 155°C to provide a vapor of N,N-dimethylformamide on the acryl varnish resin layer deposited on the copper conductor, and the deposited layer thus treated with the vapor was dried at 200°C to form a smooth insulating under-layer having a layer thickness of 22 μ. Polyester-B was then coated one time on the above insulating under-layer at a line speed of 40 m/minute and a simultaneous baking of the insulating under-layer and the upper-layer was carried out at a temperature of 450°C to form an insulating upper-layer having a layer thickness of 3 μ whereby a dual coated wire having a total coating thickness of 25 μ was obtained.

EXAMPLE 3

A copper conductor having a diameter of 0.3 mm as an anode was coated with Polyacryl-C by employing conventional electrodeposition coating using a horizontal coating machine at a line speed of 60 m/minute under the following conditions:

Cathode: A copper cylindrical tube of 6 cm in diameter and 30 cm in length
Distance between Electrodes: 3 cm
Electrodeposition Voltage: 7V D.C.
Varnish Temperature: 30 ± 1°C Any excess of the electrodeposition varnish remaining on the resulting deposited acryl resin layer was then removed using an air-wiper with a blowing nozzle angle and a slit width of the blowing nozzle of 45° and 0.1 mm, respectively, under an air supply pressure of 0.3 Kg/cm². And the thus coated conductor was passed through a cylindrical cathode tube described below which was set in a liquid bath filled with N,N-dimethylformamide, while a voltage was applied between the conductor as an anode and the cathode under the following conditions:

Cathode: A copper cylindrical tube of 6 cm in diameter and 30 cm in length
Distance between Electrodes: 3 cm
Voltage Applied: 200V D.C.
Bath Temperature: 30 ± 1°C Any excess of N,N-dimethylformamide remaining on the acryl resin layer leaving the bath was then removed by air-wipering as described above but using an air-supply pressure of 0.5 Kg/cm², and the resin layer was dried at a temperature of 200°C to form a smooth insulating under-layer having a layer thickness of 22 μ. Polyester-C was then coated one time on the above insulating under-layer at a line speed of 60 m/minute, and a simultaneous baking of the insulating under-layer and the upper-layer was carried out at a temperature of 550°C to form an insulating upper-layer having a layer thickness of 3 μ whereby a dual coated wire having a total coating thickness of 25 μ was obtained.

EXAMPLES 4 TO 12 AND COMPARATIVE EXAMPLES 1 TO 5

Similar preparation methods for producing a dual coated wire as described in Example 3 were repeated in Examples 4 to 12, and in Comparative Examples 3 to 4, whereas similar preparation of Example 1 in Comparative Examples 1, 2 and 5, were conducted but using the varnishes shown in Table 1 in place of the Polyacryl-B and Polyester-B, or Polyacryl-A and Polyester-A, respctively, employed in these examples.

The polyvinyl formal (PVF) varnish used in Comparative Examples 4 and 5 is composed of 100 parts (by weight) of a polyvinyl formal resin (trade name: BINIREKKU-FL, manufactured by Chisso Co.), 70 parts of trimer of toluene diisocyanate stabilized with glycerin and phenol, 15 parts of a resole type phenolformaldehyde resin (trade name: "Plyophen 5030", manufactured by Japan Reichhold Chemicals Inc.), 5 parts of butylated melamine, 200 parts of m-cresol, 300 parts of solvent naphtha.

Each insulated wire prepared in Examples 1 to 12, and Comparative Examples 1 to 5 was subjected to several tests including heat resistance as well as general test evaluations for determining the characteristics and properties of the insulated magnet wire.

The test results obtained are shown in Table 1, wherein heat resistance of each wire is shown as thermal life which corresponds to the period of time at the end of which wire, tested in accordance with IEEE No. 57, failed.

In order to compare the heat resistance of each dual coated wire of the above Examples and Comparative Examples with those of corresponding single coated wires which are insulated only with the varnish used in the under or upper layer of corresponding dual coated wire, single coated wires prepared by the methods described hereinafter and were subjected to heat resistance test at 220°C and 260°C in accordance with IEEE No. 57.

The test result of each of single coated wire insulated with the under layer varnish of the corresponding dual coated wire is shown with thermal life in the row of Table 1 designated as "Single Coated Wire-a", whereas the test result of each wire insulated with the upper layer varnish of the corresponding dual coated wire in the row indicated as "Single Coated Wire-b", respectively.

Preparation of single coated wires

Using the above described polyacryl varnishes Polyacryl-A to Polyacryl-L, twelve kinds of polyacryl single coated wires were prepared by the method used in applying Polyacryl-C on a conductor as described in Example 3 except that the electrodeposition voltage was 8V instead of 7V, whereby a coating thickness after baking at 550°C became 25 μ. Insulated wires coated with Polyacryl-M or the PVF varnish were prepared using the method for applying Polyacryl-A on the conductor as described in Example 1 except that the coating and baking procedure was repeated six times instead of five times so that the film thickness became 25 μ after baking at 400°C. Also, using the above polyester varnishes, Polyester-A to Polyester-J, ten kinds of polyester single coated wires were prepared, wherein a copper conductor, 0.3 mm in diameter, was coated with a polyester varnish aforementioned by the conventional dip-coating using a horizontal coating machine and a metal die, thenafter the coated conductor was introduced into an oven maintained at a temperature of 400°C in a line speed of 40 m/minute to bake the coating layer at that temperature. The above procedure was repeated 6 times to form a baked coating layer having a coating thickness of 25 μ.

As seen in Table 1, all of the dual coated insulating wire of Examples 1 to 12 not only has a surprisingly superior thermal life (heat resistance) at both of the temperatures examined in comparison with the thermal life of the corresponding single coated wires as well as that of any of the dual coated insulating wires of the Comparative Examples, but also has well-balanced properties.

Table 1

| | | Example 1 | Example 2 | Example 3 | Example 4 | Example 5 | Example 6 |
|---|---|---|---|---|---|---|---|
| Wire Structure | Under Layer | Polyacryl-A | Polyacryl-B | Polyacryl-C | Polyacryl-D | Polyacryl-E | Polyacryl-F |
| | Upper Layer | Polyester-A | Polyester-B | Polyester-C | Polyester-D | Polyester-E | Polyester-F |
| Continuity* (number of pinholes/5m) | | 0 | 0 | 0 | 0 | 0 | 0 |
| Mandrel Diameter* | | good for 1× | good for 1× | good for 1× | good for 1× | good for 1× | good for 1× |
| Breakdown Voltage* (KV) | | 9.0 | 8.8 | 9.0 | 9.5 | 9.0 | 8.5 |
| Abrasion Resistance* (strokes) | | 35 | 55 | 30 | 43 | 38 | 51 |
| Cut Through Temperature** (°C) | | 180 | 178 | 178 | 172 | 163 | 183 |
| Heat Shock, at 200°C × 1 hr | | good for 2× | good for 1× | good for 3× | good for 1× | good for 2× | good for 1× |
| Chemical and Solvent Resistance*, 30°C × 24 hrs | Sulfuric Acid (S.G. = 1.2) | pass | pass | pass | pass | pass | pass |
| | Sodium Hydroxide (1%) | pass | pass | pass | pass | pass | pass |
| | Benzene | pass | pass | pass | pass | pass | pass |
| Thermal Life***, 220°C (hrs) | | 2520 | 11840 | 5830 | 6510 | 1730 | 1820 |
| Compared Thermal Life***, 220°C (hrs) | Single coated wire - a | 278 | 270 | 273 | 280 | 278 | 303 |
| | Single coated wire - b | 1380 | 4030 | 3420 | 2632 | 1221 | 1050 |
| Thermal Life***, 260°C (hrs) | | 230 | 643 | 465 | 583 | 184 | 139 |
| Compared Thermal Life***, 260°C (hrs) | Single coated wire - a | 45 | 42 | 42 | 40 | 39 | 39 |
| | Single coated wire - b | 153 | 344 | 338 | 268 | 154 | 81 |

| | | Example 7 | Example 8 | Example 9 | Example 10 | Example 11 | Example 12 |
|---|---|---|---|---|---|---|---|
| Wire Structure | Under Layer | Polyacryl-G | Polyacryl-H | Polyacryl-I | Polyacryl-J | Polyacryl-K | Polyacryl-L |
| | Upper Layer | Polyester-G | Polyester-H | Polyester-I | Polyester-A | Polyester-C | Polyester-G |
| Continuity* (number of pinholes/5 m) | | 0 | 0 | 0 | 0 | 0 | 0 |
| Mandrel Diameter* | | good for 1× | good for 1× | good for 1× | good for 1× | good for 1× | good for 1× |
| Breakdown Voltage* (KV) | | 9.0 | 9.0 | 8.8 | 9.4 | 9.2 | 9.0 |
| Abrasion Resistance* (strokes) | | 52 | 34 | 40 | 36 | 40 | 49 |
| Cut Through Temperature** (°C) | | 185 | 170 | 169 | 163 | 180 | 177 |
| Heat Shock, at 200°C × 1 hr | | good for 1× | good for 2× | good for 3× | good for 2× | good for 3× | good for 1× |
| Chemical and Solvent Resistance*, 30°C × 24 hrs | Sulfuric Acid (S.G. = 1.2) | pass | pass | pass | pass | pass | pass |
| | Sodium Hydroxide (1%) | pass | pass | pass | pass | pass | pass |
| | Benzene | pass | pass | pass | pass | pass | pass |
| Thermal Life***, 220°C (hrs) | | 11400 | 1710 | 2030 | 1982 | 6321 | 11310 |
| Compared Thermal Life***, 220°C (hrs) | Single coated wire - a | 298 | 308 | 273 | 270 | 295 | 284 |
| | Single coated wire - b | 5110 | 998 | 1032 | 1380 | 3420 | 5110 |
| Thermal Life***, 260°C (hrs) | | 680 | 183 | 210 | 178 | 525 | 598 |
| Compared Thermal Life***, 260°C (hrs) | Single coated wire - a | 43 | 40 | 41 | 42 | 41 | 44 |
| | Single coated wire - b | 473 | 126 | 137 | 153 | 338 | 473 |

| | | Comparative Example 1 | Comparative Example 2 | Comparative Example 3 | Comparative Example 4 | Comparative Example 5 |
|---|---|---|---|---|---|---|
| Wire Structure | Under Layer | Polyacryl-M | Polyacryl-M | Polyacryl-A | Polyacryl-A | PVF |
| | Upper Layer | Polyester-J | Polyester-A | Polyester-J | PVF | Polyester-A |
| Continuity* (number of pinholes/5 m) | | 0 | 0 | 0 | 0 | 0 |
| Mandrel Diameter* | | good for 1× | good for 1× | good for 1× | good for 1× | good for 1× |
| Breakdown Voltage* (KV) | | 8.1 | 8.4 | 9.1 | 9.4 | 9.9 |

-continued

|  | Comparative Example 1 | Comparative Example 2 | Comparative Example 3 | Comparative Example 4 | Comparative Example 5 |
|---|---|---|---|---|---|
| Abrasion Resistance* (strokes) | 3 | 5 | 17 | 44 | 65 |
| Cut Through Temperature** (°C) | 83 | 90 | 140 | 170 | 201 |
| Heat Shock, at 200°C × 1 hr | good for 5× | good for 4× | good for 3× | good for 1× | good for 1× |
| Chemical and Solvent Resistance*, 30°C × 24 hrs — Sulfuric Acid (S.G. = 1.2) | pass | pass | pass | pass | pass |
| Chemical and Solvent Resistance*, 30°C × 24 hrs — Sodium Hydroxide (1%) | pass | pass | pass | pass | pass |
| Chemical and Solvent Resistance*, 30°C × 24 hrs — Benzene | fail | fail | pass | pass | pass |
| Thermal Life***, 220°C (hrs) | 100 | 295 | 195 | 185 | 290 |
| Compared Thermal Life***, 220°C (hrs) — Single coated wire - a | 101 | 101 | 278 | 278 | 96 |
| Compared Thermal Life***, 220°C (hrs) — Single coated wire - b | 89 | 1380 | 89 | 96 | 1380 |
| Thermal Life***, 260°C (hrs) | 19 | 49 | 29 | 33 | 43 |
| Compared Thermal Life***, 260°C (hrs) — Single coated wire - a | 23 | 23 | 45 | 45 | 22 |
| Compared Thermal Life***, 260°C (hrs) — Single coated wire - b | 13 | 153 | 13 | 22 | 153 |

\* tested in accordance with JIS C 3210
\*\* tested in accordance with MIL-W-583C 4,7,11,1.
\*\*\*tested in accordance with IEEE No.57

While the invention has been described in detail and with reference to specific embodiments thereof, it will be apparent to one skilled in the art that various changes and modifications can be made therein without departing from the spirit and scope thereof.

What is claimed is:

1. A method for producing an insulating wire comprising a conductor having thereon an overcoating of a baked insulating layer of a polyacryl resin and a baked layer of a polyester resin overcoated on said polyacryl resin layer, comprising the steps of
   a. electrophoretically depositing said polyacryl resin layer on said conductor;
   b. subjecting said deposited polyacryl resin layer on said conductor in an organic solvent bath to a DC voltage of from about 30 to 500 volts applied between said conductor and a cathode in said organic solvent bath;
   c. drying said polyacryl resin layer on said conductor;
   d. dipcoating said polyester resin layer over said polyacryl resin layer on said conductor; and
   e. baking said polyester resin layer and said polyacryl resin layer at a temperature of from about 200 to 500°C, said polyacryl resin comprising a copolymer of (a) at least one compound represented by the formula (I):

(I)

b. at least one compound represented by the formula (II)

(II)

and
   c. at least one unsaturated organic acid, said acid having from 3 to about 30 carbon atoms and at least one double bond which is reactable with the double bond of said compound of the formula (I) or (II), wherein $R_1$ represents a hydrogen atom or an alkyl group having 1 to about 30 carbon atoms, $R_2$ represents a cyano group, an aldehyde group or a carboxyalkyl ester group having from 2 to about 30 carbon atoms, and $R_3$ and $R_4$ each represents a hydrogen atom, an organic group having 1 to about 30 carbon atoms selected from the group consisting of an alkyl group, an amide group, an N-alkylamide group, an alkylol group, a glycidyl-ether group and a glycidylester group, except that both $R_3$ and $R_4$ are not simultaneously a hydrogen atom or an alkyl group and said polyester resin comprising a copolymer of (d) at least one compound selected from the group consisting of terephthalic acid and a derivative thereof, and (e) a mixture of polyols comprising at least one diol and at least one of a triol, a tetraol, or a mixture of a triol and a tetraol, and said polyol mixture containing about 40 to about 97% equivalents of said diol.

2. The method of claim 1, wherein said organic solvent is a monohydric alcohol, a polyhydric alcohol or a cellosolve.

3. The method of claim 1, wherein said organic solvent is N,N-dimethyl formamide, N,N-dimethyl acetamide, N-2-methylpyrrolidone, or dimethylsulfoxide.

4. The method of claim 1, wherein said polyacryl resin comprises from about 1 to 20 moles of the compound of formula (I) per mole of the compound of formula (II) and from about 0.01 to 0.2 mole of the unsaturated organic acid per mole of the total moles of the compound of formula (I) and the compound of formula (II).

5. The method of claim 1, wherein said compound of formula (I) is acrylonitrile, methacrylonitrile, methylacrylate, ethylacrylate, propylacrylate, butylacrylate, methylmethacrylate, ethylmethacrylate, propylmethacrylate, or acrolein, wherein said compound of formula (II) is glycidylacrylate, glycidylmethyacrylate, allylglycidylether, acrylamide, methylolacrylamide, or ethylacrylamide and wherein said unsaturated organic acid is acrylic acid, methacrylic acid, α-ethylacrylic acid, crotonic acid, maleic acid, or fumaric acid.

6. The method of claim 1, wherein any excess of said bath adhering to said polyacryl resin layer is removed by wiping between step (a) and said step (b), or between said step (b) and said step (c).

* * * * *